United States Patent
Tallman et al.

(10) Patent No.: US 6,175,308 B1
(45) Date of Patent: Jan. 16, 2001

(54) PERSONAL DURESS SECURITY SYSTEM

(75) Inventors: Erven Tallman, Rancho Mirage, CA (US); Dan Minardi, Arvada; Jeff Hill, Aurora, both of CO (US)

(73) Assignee: Actall Corporation, Tustin, CA (US)

( * ) Notice: Under 35 U.S.C. 154(b), the term of this patent shall be extended for 0 days.

(21) Appl. No.: 09/005,564

(22) Filed: Jan. 12, 1998

Related U.S. Application Data

(63) Continuation of application No. 08/167,216, filed on Dec. 16, 1993, now Pat. No. 5,708,417.

(51) Int. Cl.[7] .................................................. G08B 1/08
(52) U.S. Cl. .............. 340/539; 340/825.49; 340/825.34; 340/825.36; 340/825.72; 340/573.1; 340/573.4; 359/145; 359/152; 359/172
(58) Field of Search ................................. 340/525, 573.1, 340/573.4, 825.49, 825.36, 825.34, 825.72, 539; 359/145

(56) References Cited

U.S. PATENT DOCUMENTS

| | | |
|---|---|---|
| 4,727,600 | 2/1988 | Avakian . |
| 4,918,432 * | 4/1990 | Pauley et al. ...................... 340/573.4 |
| 4,978,946 | 12/1990 | Nordolm et al. . |
| 4,990,892 | 2/1991 | Guest et al. . |
| 4,998,095 | 3/1991 | Shields . |
| 5,027,314 | 6/1991 | Linwood et al. . |
| 5,045,839 | 9/1991 | Ellis et al. . |
| 5,103,108 | 4/1992 | Crimmins . |
| 5,153,584 | 10/1992 | Engira . |
| 5,204,687 | 4/1993 | Elliot et al. . |
| 5,218,344 * | 6/1993 | Ricketts ............................ 340/573.1 |
| 5,223,816 | 6/1993 | Levinson et al. . |
| 5,239,296 | 8/1993 | Jenkins . |
| 5,268,734 | 12/1993 | Parker et al. . |
| 5,301,353 | 4/1994 | Borras et al. . |
| 5,317,309 | 5/1994 | Vercellotti et al. . |

(List continued on next page.)

OTHER PUBLICATIONS 1994 teleProtect 900, System Description.
teleProtect 900, You'll Never Work Along With A Personal Alarm System.
Apr. 27, 1994, Harris Communications, promoting teleProtect 900.

* cited by examiner

*Primary Examiner*—Daryl Pope
(74) *Attorney, Agent, or Firm*—Fulwider Patton Lee & Utecht, LLP

(57) ABSTRACT

A security system including tracking units or readers carried or mounted on mobile units to operatively communicate status signals indicating identity, location, direction of travel, and a number of alarm conditions to a local monitoring station. The tracking units or readers are equipped with an infrared receiver to receive infrared location signals transmitted by fixed infrared transmitters located throughout the area to be monitored. Each infrared transmitter transmits a unique location signal. The tracking unit is operative to transmit a radio frequency watchdog signal that includes the last two location signals received, indicating the time lapsed since receipt of those location signals, a unique identification signal indicative of the and any applicable alarm signals triggered by predetermined conditions to which the tracking unit is also operative to detect. The monitoring station includes a computer which is operative to receive the watchdog signal by way of radio frequency receivers located throughout the area being monitored and translate the watchdog signal into useful displays including printed text on a printer, computer monitor graphic and text displays, and audible alarms.

53 Claims, 11 Drawing Sheets

U.S. PATENT DOCUMENTS

| | | |
|---|---|---|
| 5,319,698 | 6/1994 | Glidewell et al. . |
| 5,365,217 | 11/1994 | Toner . |
| 5,396,224 | 3/1995 | Dukes et al. . |
| 5,416,468 | 5/1995 | Baumann . |
| 5,426,425 | 6/1995 | Conrad et al. . |
| 5,479,408 | 12/1995 | Will . |
| 5,485,163 | 1/1996 | Singer et al. . |
| 5,552,772 | 9/1996 | Janky et al. . |
| 5,627,524 | 5/1997 | Fredrickson et al. . |
| 5,640,157 | 6/1997 | Langeraar . |
| 5,650,769 | 7/1997 | Campana . |
| 5,652,570 * | 7/1997 | Lepkofker ............................ 340/573 |
| 5,689,229 | 11/1997 | Chaco et al. . |
| 5,771,002 * | 6/1998 | Creek et al. ......................... 340/539 |
| 5,917,425 * | 6/1999 | Crimmins ....................... 340/825.49 |

PERSONAL DURESS SECURITY SYSTEM

This application is a Continuation of application Ser. No. 08/167,216, filed Dec. 16, 1993, which issued as U.S. Pat. No. 5,708,417 on Jan. 13, 1998. That application, in its entirety, is hereby expressly incorporated herein by reference.

BACKGROUND OF THE INVENTION

1. Field of the Invention

The present invention relates in general to the field of security devices, and, in particular, to a system which may be utilized to track the whereabouts and status of a plurality tracking units carried by persons or items located about a substantial area of interest such as an office building, school campus, hospital, or prison facility, and to communicate data on the status of these persons or items to a central monitoring station.

2. Description of the Prior Art

There has long been a need for a security system to provide accurate, meaningful, real time monitoring of persons and objects throughout large areas such as automobile sales lots, office buildings, school campuses, hospitals, and prison facilities. In order for security and loss-prevention professionals to adequately protect the persons and property under their care and supervision, it is necessary for such a security system to indicate the current location of the monitored persons and objects, as well as to set off any one of a number of alarm conditions depending on the need for further investigation and assistance.

Automobile sales lots and congregate care facilities are characterized by an ever-changing inventory arrayed over a relatively large area which must be continually monitored for custodial purposes. Devices have been proposed to monitor unattended automobiles to prevent or discourage theft. Numerous different anti-theft devices have included various bars to lock onto an automobile steering wheel and which in some instances attach to the accelerator pedal.

Other efforts have employed hidden switches to disable the ignition system and shock and motion sensors. Such sensors, upon impulse, actuate an automobile disabling switch and alarm as shown in U.S. Pat. No. 4,990,890. Additionally, it has been proposed to equip vehicles with external radar to sense unauthorized tampering. These systems are relatively expensive and are sometimes ineffective to monitor a large number of vehicles or to make a record of the vehicle subjected to the unauthorized activity. Also, they fail to provide for automatic telecommunication of the alarm to either a central or remote area.

Vehicle security systems have been proposed which included a respective immobilizer and transceiver module in each vehicle. A number of security stations are provided to detect low power signals emitted by vehicles when an unauthorized act is detected. The signals are transmitted to a base station in response to a polling signal therefrom. The compromised vehicle may be immobilized by signals from either the base station or from a security station. A system of this type is disclosed in U.S. Pat. No. 4,990,890.

Other systems have been proposed which include a transmitter in each vehicle to broadcast an emergency signal unique to the vehicle indicative of the nature of the emergency condition. A central station includes a receiver responsive to the signal to operate a transmitter to transmit a disabling signal to a receiver in the vehicle. An alarm sensor can be mounted on each automobile to be monitored. When disturbed, the alarm sensor actuates an automatic dialer to send either a voice or a digital signal identifying the vehicle by a radio telephone to an alarm receiving station. Such systems are shown in U.S. Pat. Nos. 4,067,411 and 4,904,983. This system lacks a self contained transmission capability as it relies on the radio telephone.

Monitoring systems have been proposed which incorporate transmitters mounted on vehicles to be monitored and operative to transmit a watchdog periodic signal to a central receiving station. The transmitted signals become weak and disappear if the vehicles are removed from beyond a predetermined boundary area. The transmitters are responsive to unauthorized tampering to discontinue transmitting thereby generating an alarm. A system of this type is disclosed in U.S. Pat. No. 3,618,067

In congregate care facilities such as hospitals and nursing homes, monitoring is required so the custodian acting as an overseer can readily check the status of a patient's condition. Further, to be effective, a congregate caretaker must have the capability of quickly responding to any emergency call. In the past, patients have sometimes been provided with manually actuated devices such as pull cords or transmitter buttons to be used in case of emergency. These devices fail to communicate meaningful intelligence to enable the caretaker to determine whether the monitored item has moved from an authorized area or to discern the character of any distress call.

For persons moving about a large geographical area, such as students on a school campus, or security guards patrolling an industrial facility, monitoring systems have been proposed which call for the person to carry a portable tracking unit, such that a person or object may be located in an emergency by locating the tracking unit assigned to that student or guard. Several systems have been proposed that call for the tracking unit to be manually actuated to transmit a distress signal that includes a unique identification code for the particular tracking unit. The distress signal is received by a local receiver, which in turn relays the distress signal, along with a code identifying the particular receiver relaying the distress signal, to a monitoring center where an alarm is triggered and appropriate action may be taken. Such a system is shown in U.S. Pat. No. 5,365,217.

A system utilizing fixed transceivers mounted on street light poles, drawing the necessary electrical power from the local municipal power system that supplies power to the street lights, is shown in U.S. Pat. No. 4,998,095. A system that relies on a plurality of receivers to simultaneously receive the same distress signal so that the location of the tracking unit may be determined by comparing the strength of the distress signal at each receiver is shown in U.S. Pat. No. 5,115,224.

Another proposal, as shown in U.S. Pat. No. 5,572,195, calls for the tracking unit to comprise an infrared transmitter for transmitting an infrared identification code to a plurality of infrared receivers connected to a computer network and located within the area of interest. Finally, yet another proposal, this one calling for local receivers to include processors for processing the received distress signal before passing it on to a central processor which stores the distress signals for periodic determination of tracking unit location, is shown in U.S. Pat. No. 5,455,851.

The above described systems of the prior art, while providing various means for transmitting a distress signal to a central monitoring station, do not provide an adequate means to constantly track the location and motion of a mobile entity in the absence of a manually-actuated distress signal, nor do they provide an adequate alternative to the manual distress signal to detect an emergency situation when the mobile entity is not in a physical condition to manually actuate the distress signal, such as if a person is injured and incapacitated due to a fall. A security system is needed that provides for constant, real time tracking of mobile entities, while being further responsive to a number of alarm conditions to display alarms so assistance may be rendered.

SUMMARY OF THE INVENTION

The security system of the present invention is characterized by tracking units or readers carried or mounted on mobile units to operatively communicate status signals indicating identity, location, and a number of alarm conditions to a local monitoring station. The tracking units or readers are equipped with receivers to receive location signals transmitted by fixed transmitters located throughout the area to be monitored. Each transmitter transmits a unique location signal. The tracking units are operative to transmit a watchdog signal that includes the last two location signals received, a unique identification signal indicative of the particular tracking unit, and any applicable alarm signals triggered by predetermined conditions to which the tracking unit is also operative to detect. The monitoring station is operative to receive the watchdog signal by way of fixed receivers located throughout the area being monitored and translate the watchdog signal into useful displays.

Other features and advantages of the invention will become apparent from the following detailed description, taken in conjunction with the accompanying drawings, which illustrate, by way of example, the features of the invention.

DETAILED DESCRIPTION OF THE PREFERRED EMBODIMENT

Figure 1:
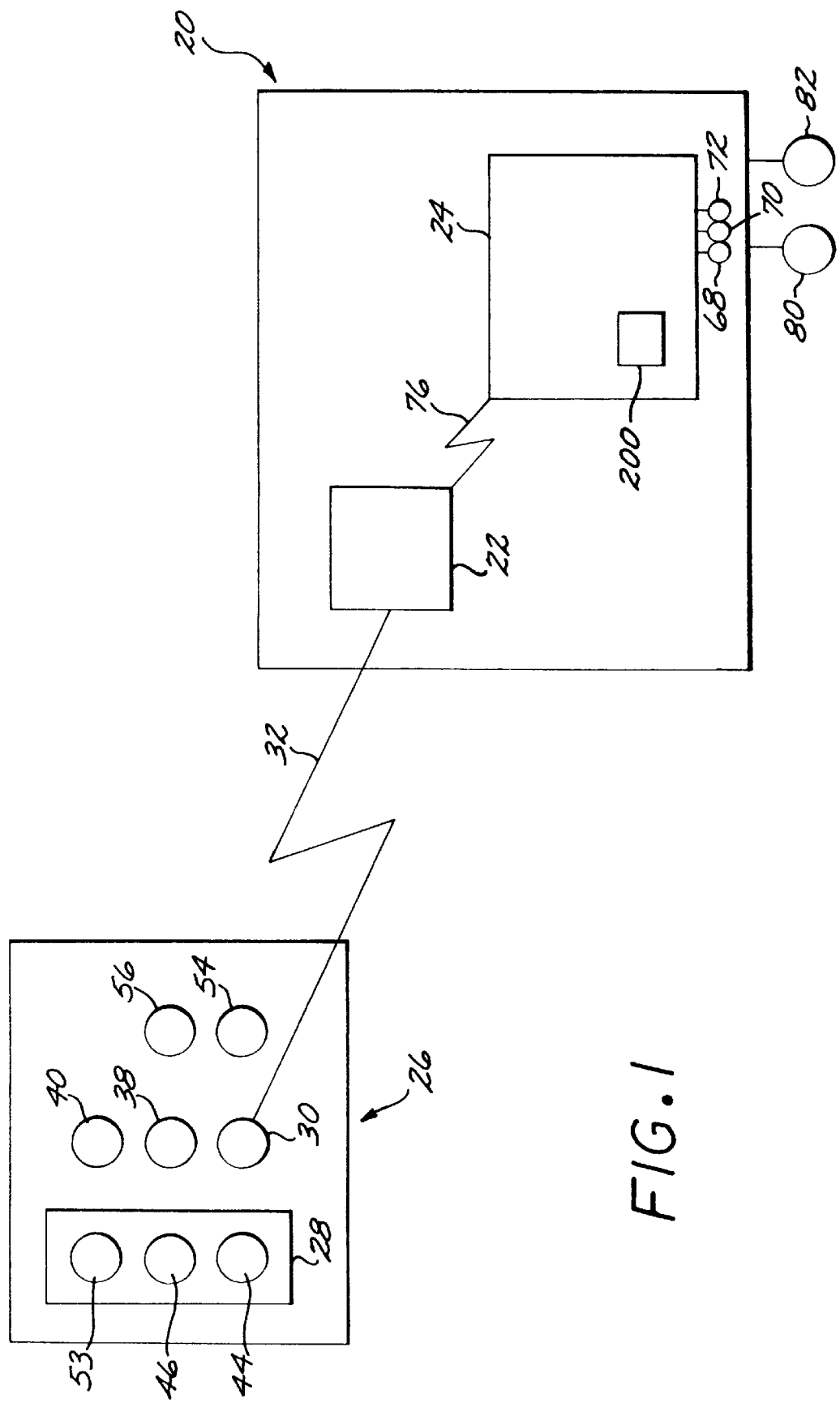
FIG. 1 presents a block diagram of a monitoring system in accordance with the invention.

As shown in the drawings for purposes of illustration, the invention is directed to a system for monitoring the status and whereabouts of individual mobile units or personnel in a specific area such as a school campus, prison facility, hospital, or industrial facility. Often the number of discrete entities or property units to be monitored is so great that it is not feasible for a single person to effectively monitor all of them.

The present invention is embodied in a system for monitoring a number of mobile units such as automobiles, personnel, or animals. In accordance with the present invention, the system utilizes a tracking unit or reader attached to, or carried by, the mobile unit to be monitored to sense and transmit identity, location, direction of travel, and alarm condition information to a computer monitoring station. The computer is programmed to record the data corresponding to identity, present and previous location, and alarm conditions and display it in a useful manner.

As shown in FIG. 1, the parent duress system of the present invention includes, generally, a local station 20 including a local receiver 22 and a local computer 24 which records and analyzes communications from a plurality of remote modules 26. The modules each include sensors 28 to sense a condition and a transmitter 30 to transmit signals 32 to the local station. The signals transmitted may have any combination of a number of attributes including: shock to the module, tampering, such as an attempt to remove the module from the mobile unit, transportation beyond a predetermined boundary, and low battery in the module.

Figure 2:
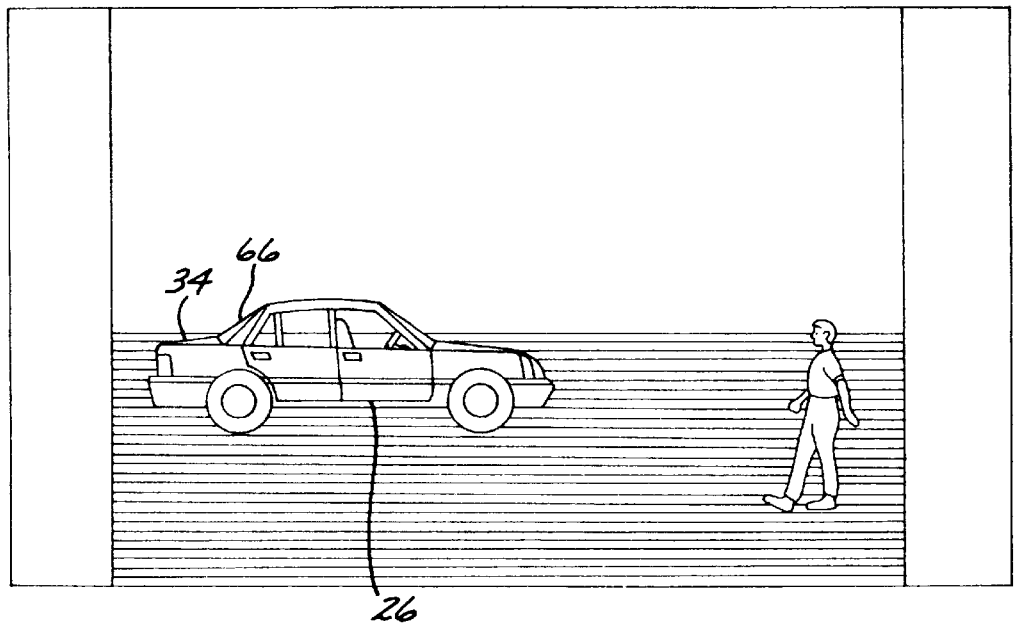
FIG. 2 is a side view of an automobile with a module included in the system of FIG. 1 mounted thereon.
Figure 3:
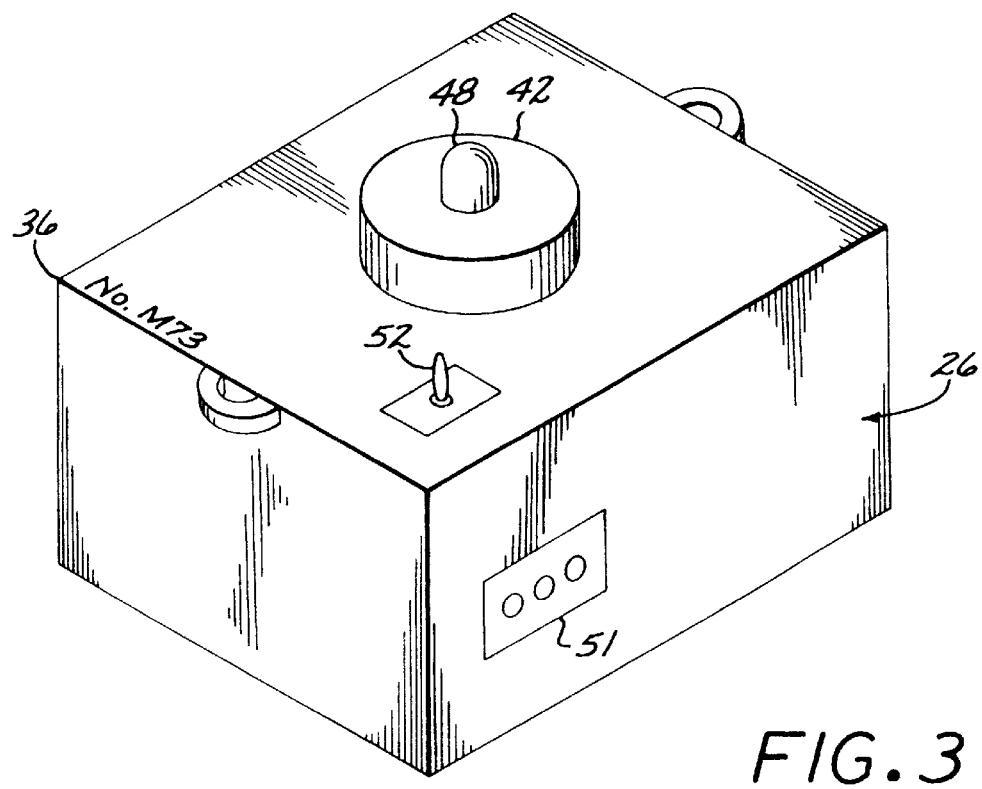
FIG. 3 is a perspective view in enlarged scale of the module shown in FIG. 1.

Referring to FIG. 2, automobiles 34 are typically randomly distributed around an automobile sales lot. The module 26 is attached to each automobile 34 on the lot. The modules 26 each include a housing 36 mounting the respective sensors 28 to activate a transmitter 30 for transmitting from an antenna 38, and a battery 40 as shown in FIGS. 1 and 3. The module housing 36 is constructed of plastic and mounts an annular magnet 42 by means of silicone. The sensors may include a shock sensor 44 (FIG. 1) which detects the presence of a certain level of movement of the car. There may also be a tamper sensor 46 which is activated by unauthorized tampering with the module. The module 26 is magnetically affixed by the magnet 42 to the underside of an automobile 34 as shown in FIG. 2. The module circuit includes a normally open spring loaded switch having an actuation arm which carries an actuation button 48 which protrudes through a bore 50 aligned with the opening in the magnet 42 and to depress to the closed position as a result of this attachment, as shown in FIG. 3. A data port connector 51 (FIG. 3) is formed through the housing and is coupled to the transmitter 30 within the module. An activation switch 52 is formed in said housing and connected in circuit with the internal components of the module to control power to the components.

Figure 4:
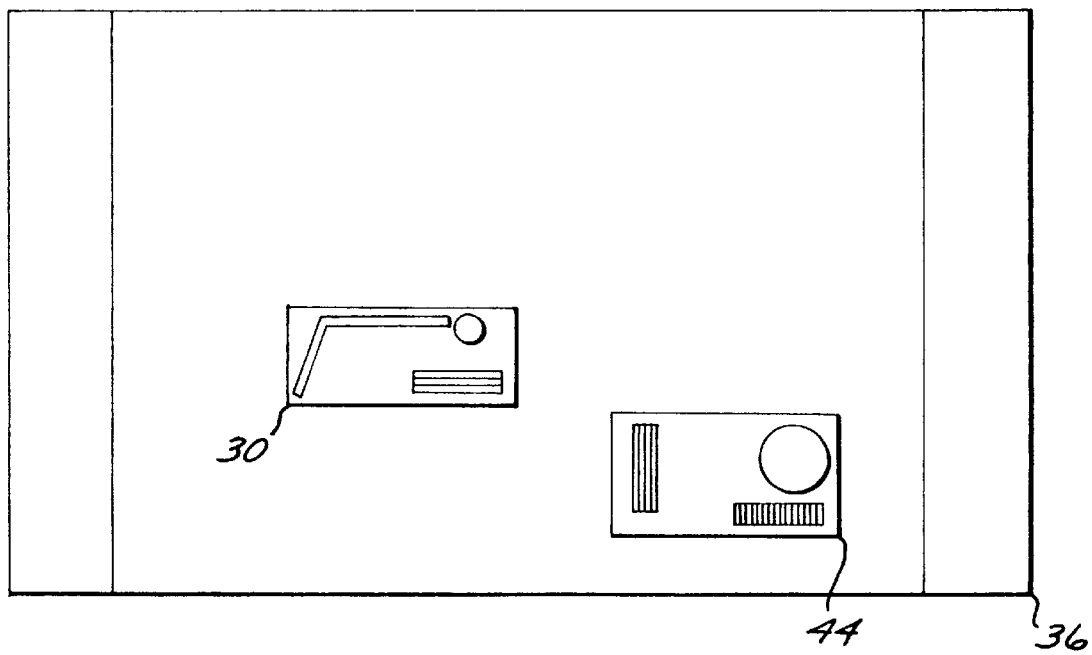
FIG. 4 is a top view of a sensor and a transmitter within the module shown in FIG. 3.
Figure 5:
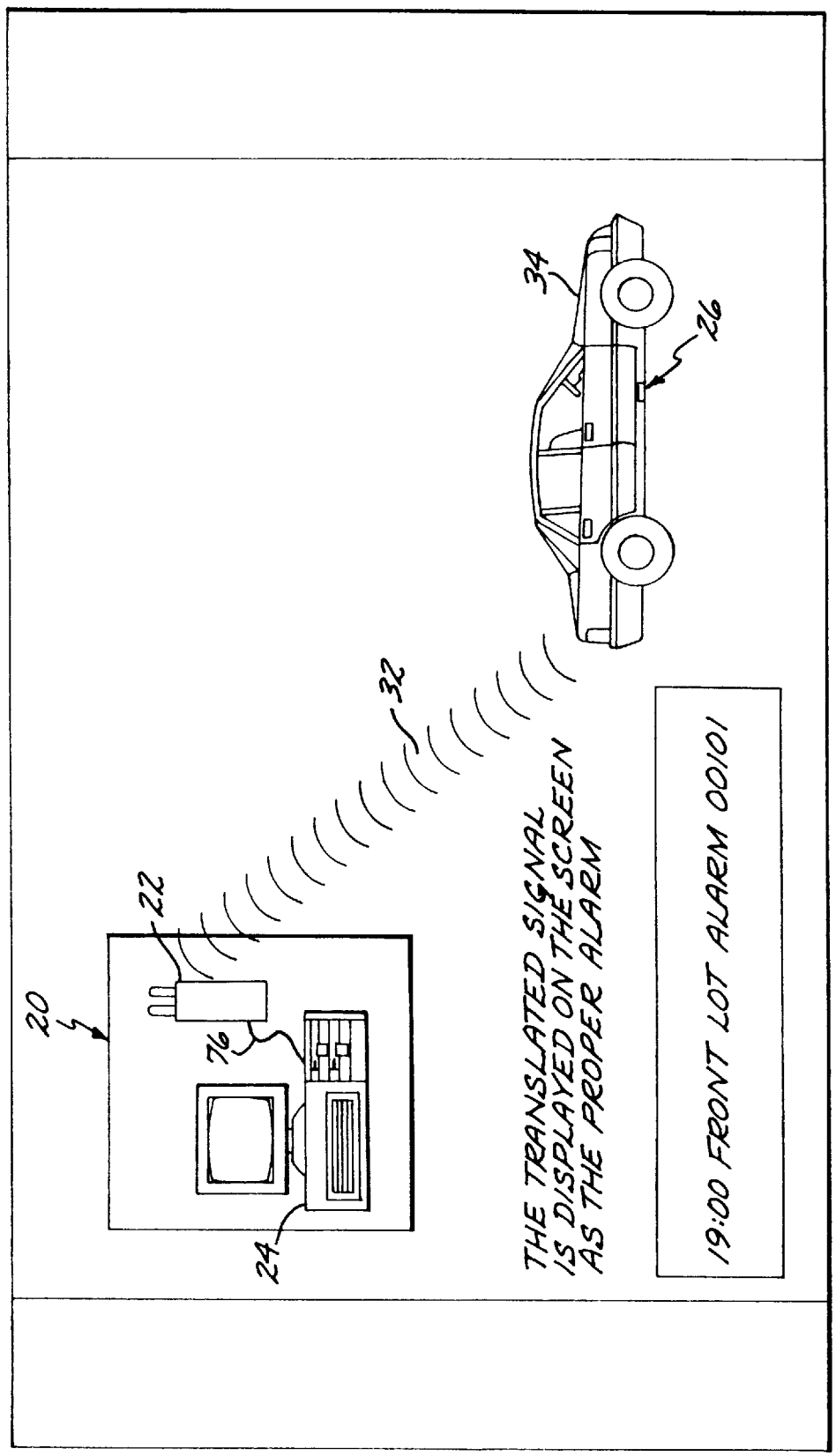
FIG. 5 is a perspective view showing the automobile with the module of FIG. 2 transmitting to a local station.

The transmitter 30 shown in FIG. 4 is responsive to these signals to generate the status signal 32 to be encoded via an encoder 54 (FIG. 1) with a unique identification number associated with the particular module, a battery voltage indicator, a shock flag, and a tamper flag, to be transmitted to the local station 20 by means of the omni-directional antenna 38 (FIG. 1) as shown in FIG. 5. A clock 56, functioning as a proximity signal generator, is coupled with the transmitter to send periodic status signals at regular intervals, for example, every ten minutes. The transmitter power is set relatively low so as to, within a fairly short distance, exceed the range of the signal generated. For automobile lot monitoring, we have selected a power level which provides a signal level of sufficient magnitude to be sensed for so long as the module 26 in the car 34 remains within a distance of about 300 feet from the local station 20, outside this range an alarm is sounded. The components within the module housing are all miniaturized to maintain the module compact.

Figure 6:
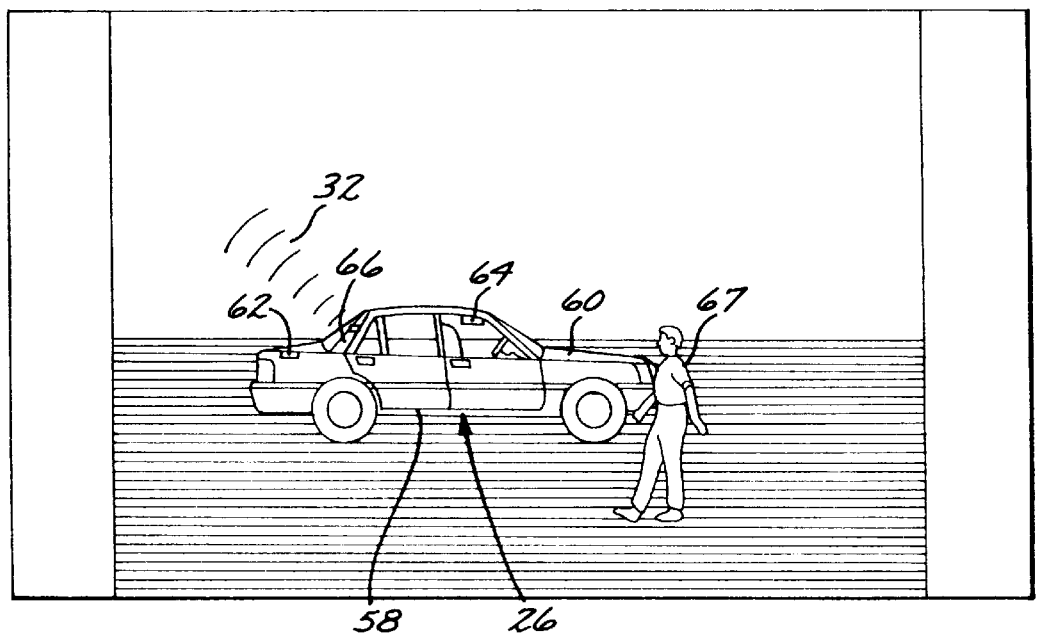
FIG. 6 is a side view of the automobile of FIG. 2 showing the module mounted at various positions thereon.

Signals 32 are transmitted from the module transmitter to the receiver at the local station using the ultra high frequency (UHF) range as shown in FIG. 6. There may be system components interposed between the module and the local station, such as systems for amplification, analysis, or filtration of the transmitted status signals.

Figure 7:
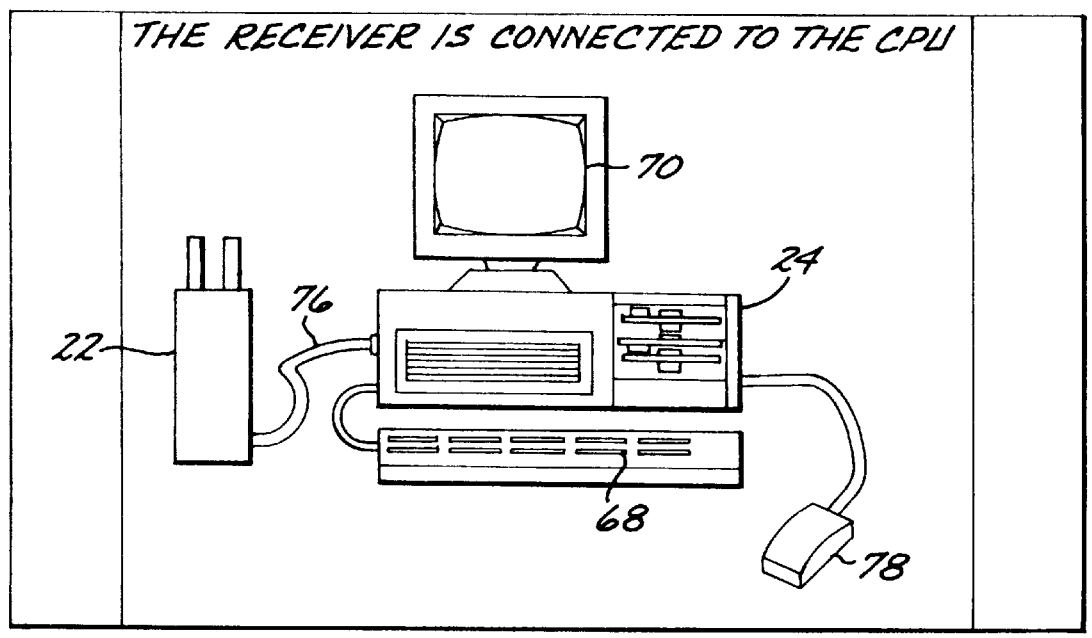
FIG. 7 is a perspective view of a receiver coupled to a computer at the local station shown in FIG. 1.

Referring to FIG. 1, the local computer 24 is fitted with a keyboard 68, a display 70, and a printer 72. The receiver 22 receives the transmitted signals 32 and converts those signals into digital signals recognizable and readable by a personal computer or a microcomputer. The digital signals are delivered to the local computer by a nine pin serial interface RS-232C connector 76 as shown in FIG. 7. The digital data conforms to recognized RS-232 protocol.

The local computer 24 contains an operating program to monitor in excess of 2,000 mobile units. The computer is programmed to alert in various modes, including prompting an audible alarm, displaying an alarm message on a computer display screen 70 (FIG. 7), printing a hard copy alert on a printer 72 (FIG. 1), or contacting an alpha-numeric pager 80, and alerting a monitoring station 82 (FIG. 1). This provides for response by management personnel, on-site security, off-site guard service, medical attendants, or police.

The monitoring system is controlled using the computer 24 at the local station. The computer 24 is programmed for recording an identification number of each automobile 34 (FIG. 5) to be monitored, an identification number of the module 26 attached to the automobile 34, the price of the automobile, the date of acquisition, whether the automobile is presently in custody, the zone where the automobile is physically located within the lot, a description of the automobile, the serial number of the automobile, ownership information of the automobile, and authorized possessors of the automobile.

The computer 24 is operated by a program to analyze and respond to the signal received from the receiver 22 (FIG. 1). The operating system program functions as a decoder to decode the identification number of the transmitting module as well as shock, tamper, and battery voltage indicator flags from the receiver signal. The operating system also functions as a discriminator for correlating the identification number with an associated module and determining vehicle information from the module identity. The operating system also includes a detector function to detect the absence of a periodically transmitted signal from a module. The computer 24 at the local station thereby decodes alarm flags and detects the absence of such a receiver signal when expected. The local computer 24 (FIG. 1) also monitors the periodic receipt of receiver signals 74 (FIG. 1) from all of the modules attached to automobiles.

Figure 8:
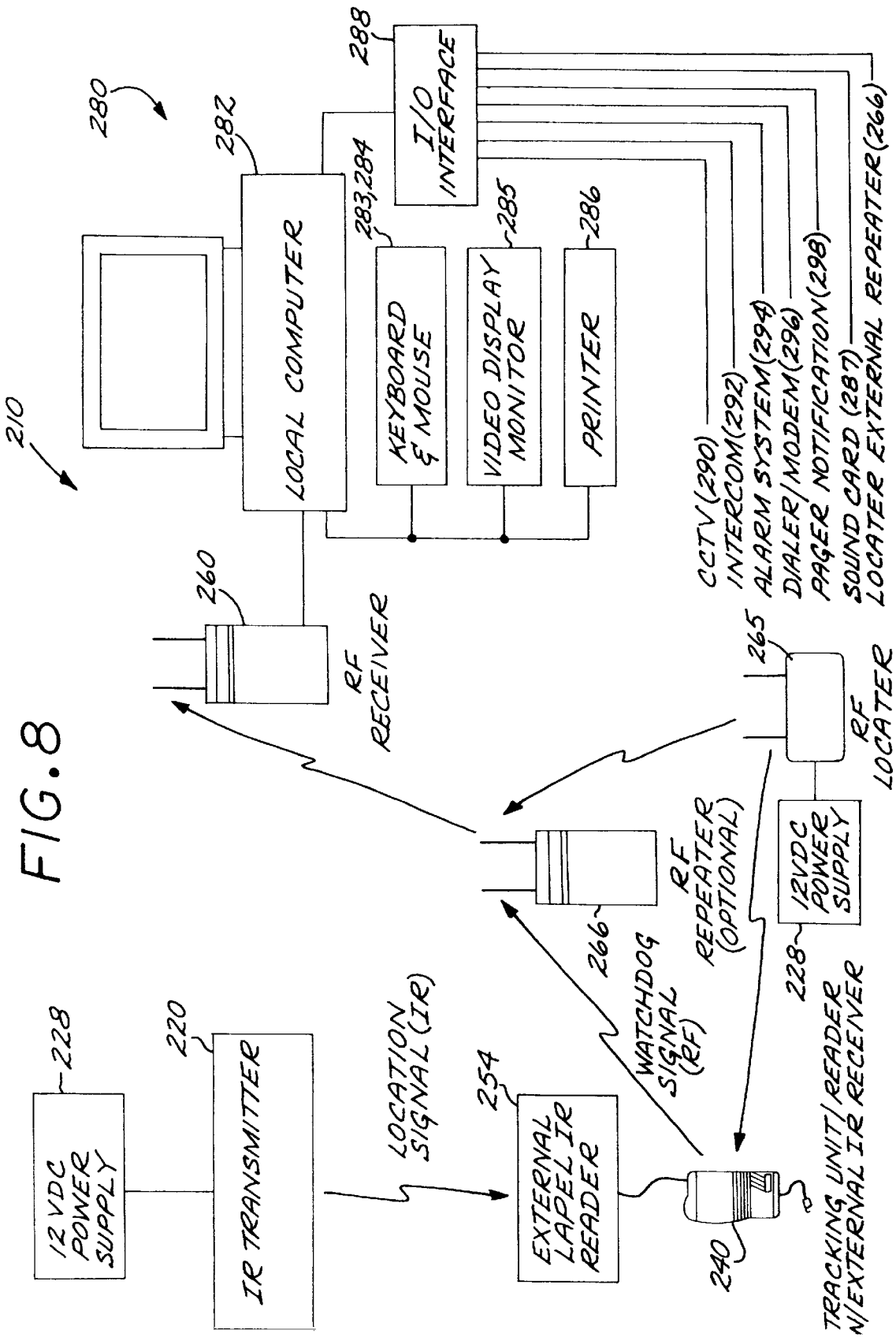
FIG. 8 represents a block diagram of a security system in accordance with the preferred embodiment of the present invention.

The personal security system of the present invention may be embodied in a system adapted primarily to track a person or thing carrying a tracking unit or reader, generally designated as 240 moving about a predetermined area (FIG. 8). The system, generally designated 210 includes, generally, at least one infrared transmitter 220 located within the area to be monitored, one tracking unit or reader 240 per mobile unit to be monitored, at least one radio frequency receiver 260, and a computer monitoring system 280.

Figure 9:
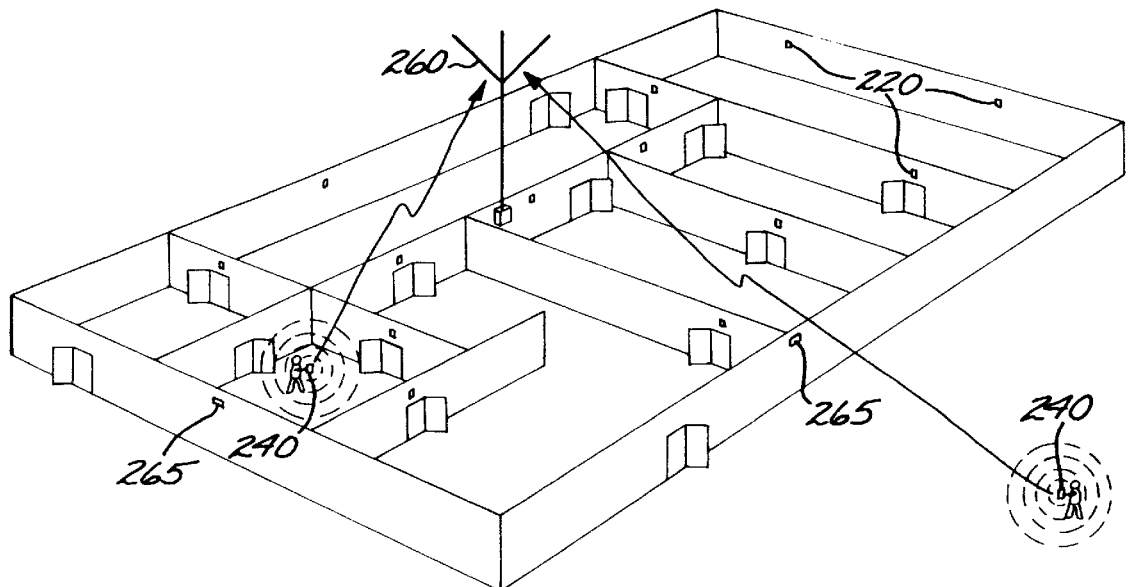
FIG. 9 is a perspective view of the interior of a building incorporating a security system in accordance with FIG. 8, including tracking units transmitting a watchdog signal to a radio frequency receiver.
Figure 10:
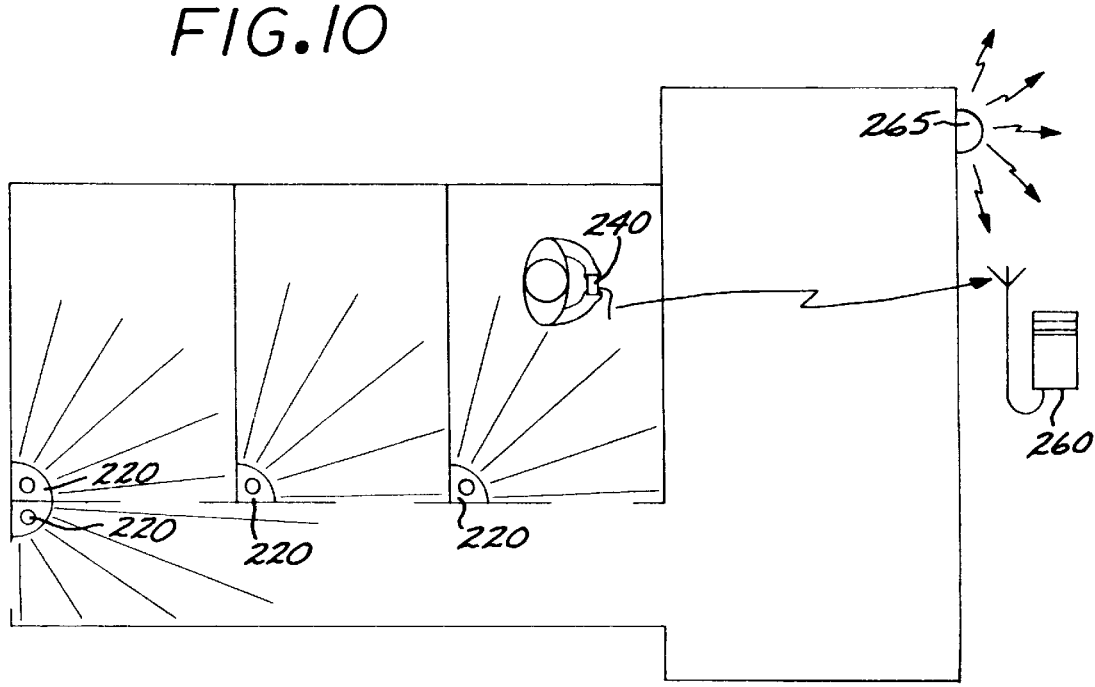
FIG. 10 is a top plan view of a corridor of a building incorporating a security system in accordance with FIG. 8, including infrared transmitters transmitting location signals and a tracking unit transmitting a watchdog signal to a radio frequency receiver.
Figure 11:
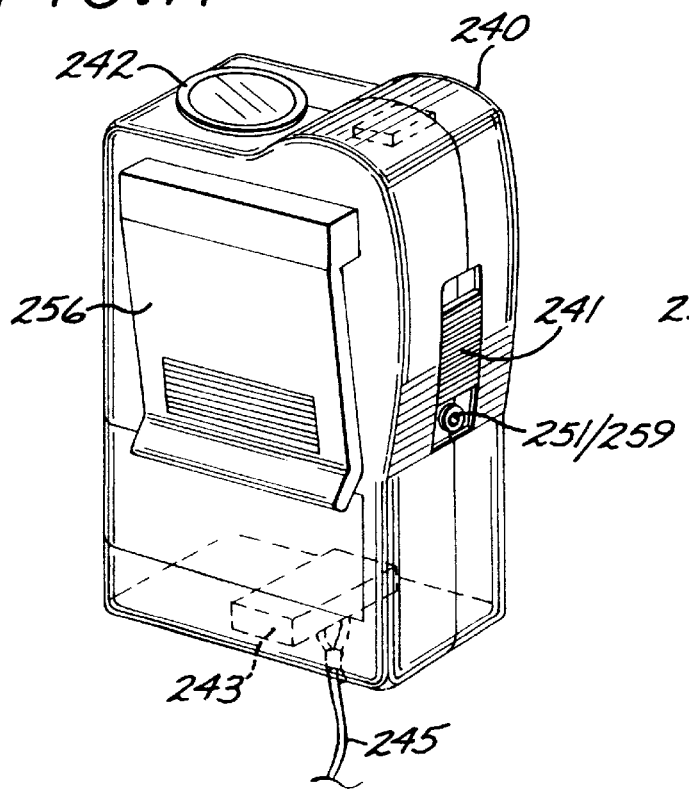
FIG. 11 is a perspective view in enlarged scale of a tracking unit included in the system shown in FIG. 8.
Figure 14:
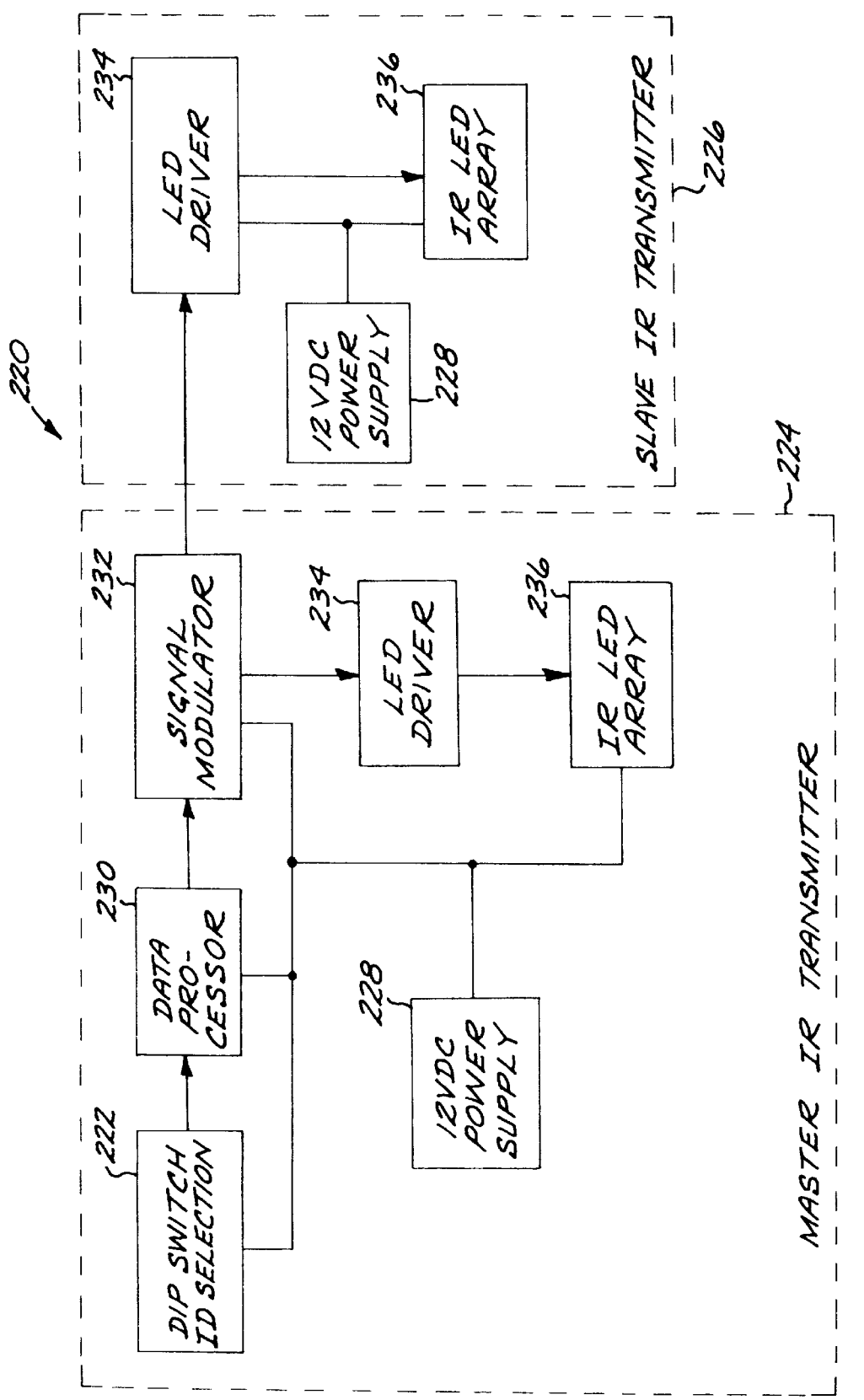
FIG. 14 is a block diagram of an infrared transmitter system included in the system of FIG. 8.

The infrared (IR) transmitter 220 generates and broadcasts a unique location code, set by DIP switches 222, via an IR signal of known strength and range. For large areas or rooms for which it is desirable to indicate as a single location, even though the area exceeds the range of the IR signal, the IR transmitter 220 may take the form of one or more slave IR transmitters 226 connected to a master IR transmitter 224 so that a large area, such as an auditorium, may be identified by a single location code. As depicted in FIG. 14, the master IR transmitter 224 operates on a standard 12-volt DC power supply 228. By setting several DIP switches 222, a data processor 230 is programmed to generate a predetermined location signal. A signal modulator 232 converts the digital location signal from the data processor 230 into analog form and sends it to a light-emitting diode (LED) driver 234, which then controls an IR LED array 236 to broadcast the IR location signal. Multiple slave IR transmitters 226, also powered by a standard 12-volt power supply 228, include only the LED driver 234 and IR LED array 236 elements, receiving the analog IR location signal from the master IR transmitter 224. While a 12-volt power supply is supposed here, it should be noted that other power supplies may be used by making appropriate modifications to the circuitry of the IR transmitter 220. The IR transmitters 220 are most effectively located such that the known signal range of each IR transmitter 220 does not overlap with any other IR transmitter 220. As indicated in FIGS. 9 and 10, the IR transmitters 220 may be located on poles, above doors, in a ceiling, or in any other suitable unobtrusive location in a fixed manner to prevent removal or relocation by unauthorized persons. The IR transmitters 220 are suitable for utilizing power from a 12-volt DC power source. In outdoor areas, or in indoor areas with substantial ambient light that interferes with IR signals or where a continuous line of sight is not possible in the room due to partitions of various forms, the IR transmitter 220 may be replaced with or incorporated to operate selectively or continuously in tandem or together with an RF transmitter or locator 265 operating in a substantially similar manner as the IR transmitter 220, but in the radio frequency bandwidth.

Figure 15:
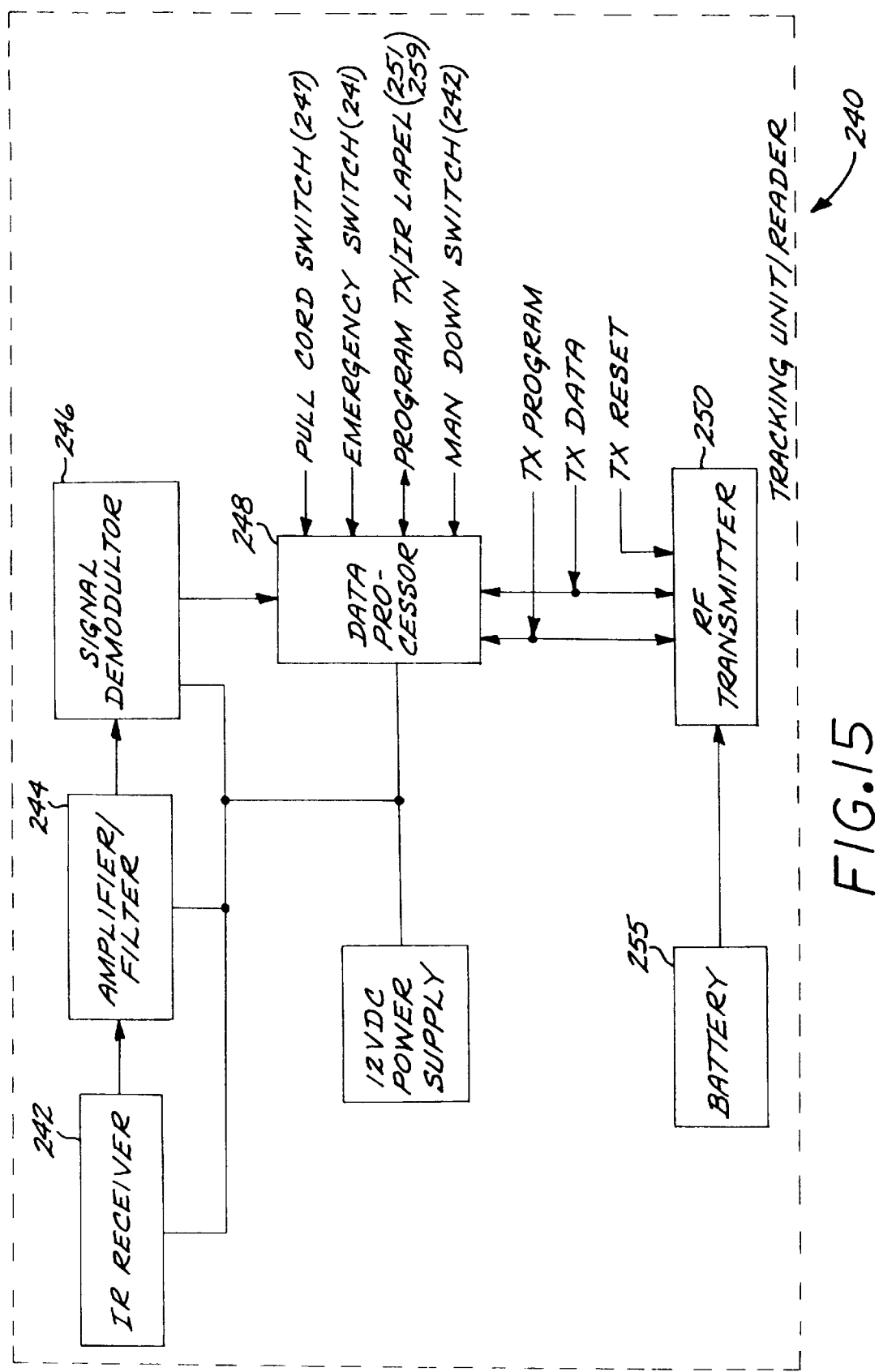
FIG. 15 is a block diagram of a tracking unit included in the system of FIG. 8.
Figure 16:
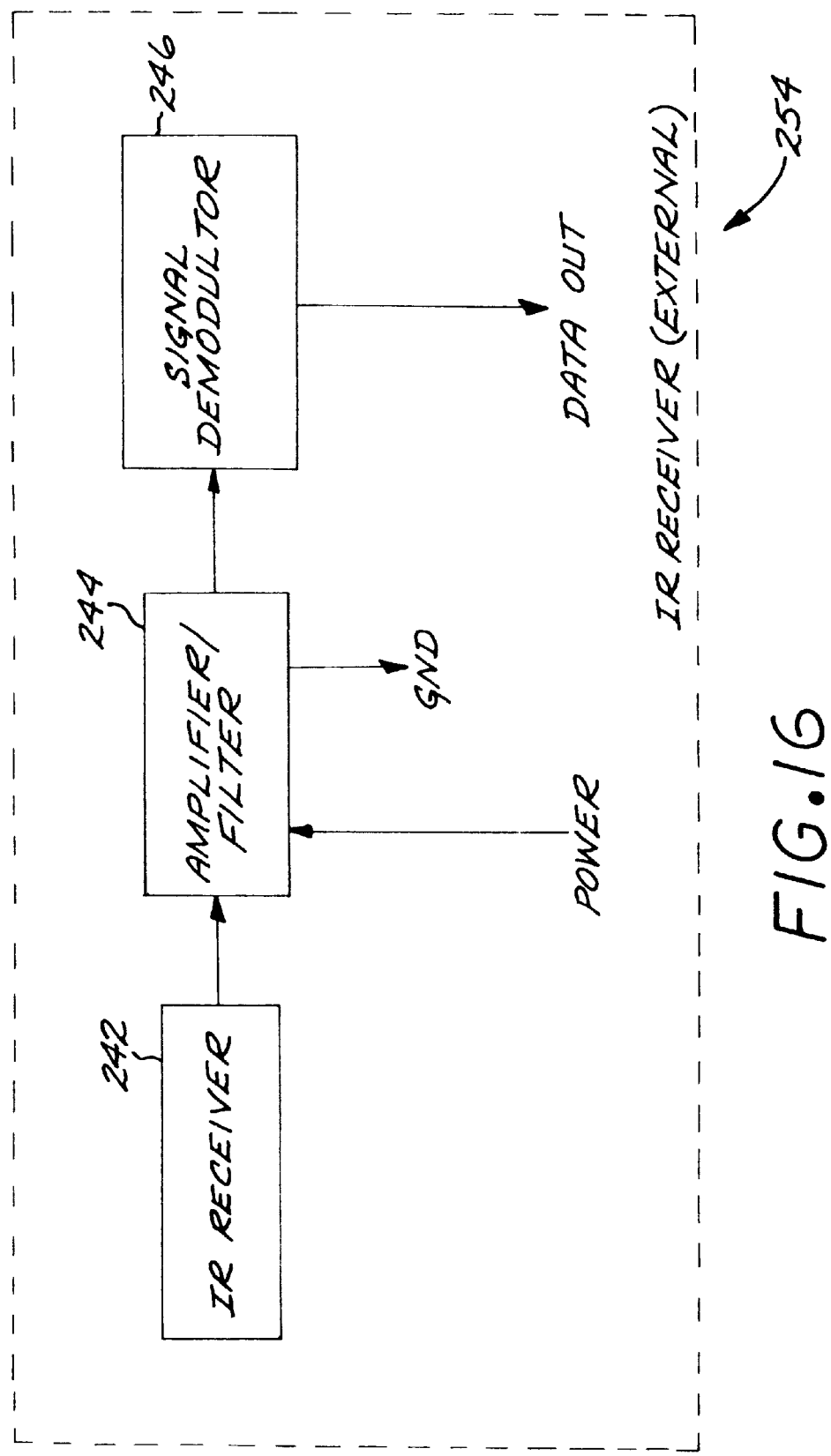
FIG. 16 is a block diagram of a portable infrared receiver included in the system shown in FIG. 8.

A mobile unit moving about the area to be monitored, for instance a security guard patrolling a school campus, will carry a tracking unit or reader 240. The tracking unit or reader 240 (hereinafter referred to only as a reader), as indicated in FIGS. 8–13, is operative to receive the location signals broadcast by the IR transmitters 220. Upon receipt of the location signal, the tracking unit or reader 240 generates a watchdog signal that carries the two most recently received location signals, as well as a unique reader identification code, then transmits the watchdog signal on a radio frequency (RF) signal. The reader 240 is encased in an ABS plastic case, and has dimensions of approximately 10-cm H×5-cm W×2.5-cm D, and is powered by a lithium battery. As depicted in FIG. 15, the reader 240 includes an IR receiver 242 for receiving the IR location signal.

Connected to the IR receiver 242 is an electrical amplifier/filter 244 to amplify the IR location signal and increase the signal-to-noise ratio to a useful level. A signal demodulator 246 converts the analog IR location signal to a digital signal suitable for use by the reader's programmable data processor 248. The reader's RF transmitter 250 transmits the watchdog signal using 900 MHz Spread Spectrum Technology via an internal wire antenna 252. The reader 240 further includes an internal programmable data processor 248 which can be programmed with a unique reader identification code and is operative to generate the watchdog signal. The reader 240 also includes a data port 251 for connection by a suitable cable of an external programming device such as a personal computer for programming the data processor 248.

Figure 12:
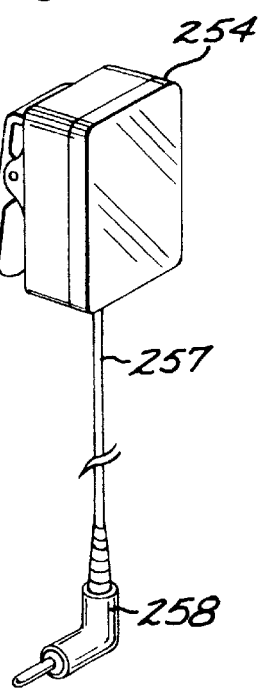
FIG. 12 is a perspective view in enlarged scale of a portable infrared receiver included in the system shown in FIG. 8.
Figure 13:
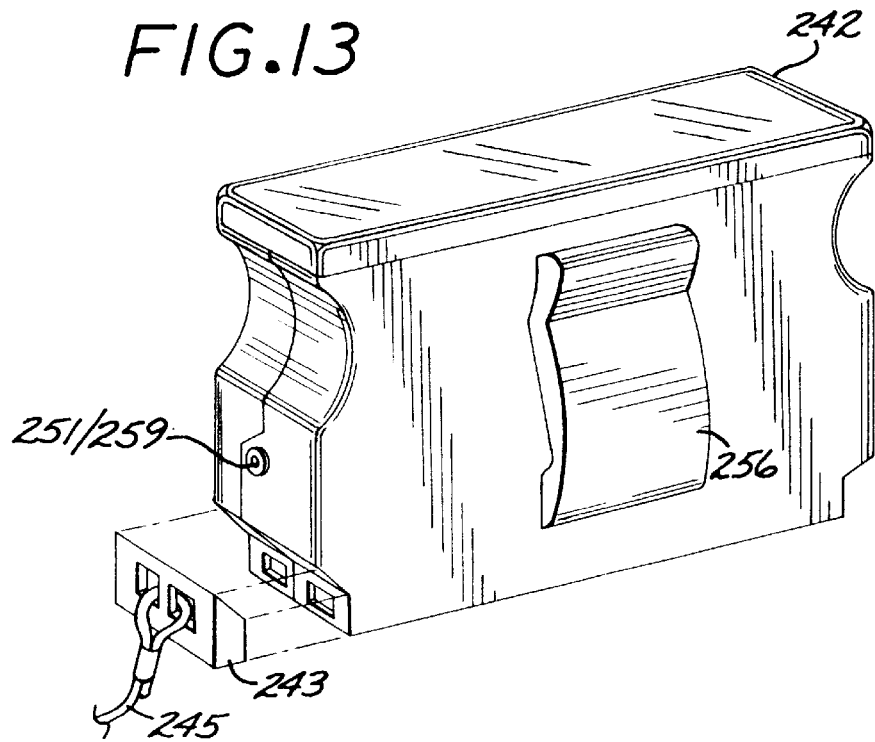
FIG. 13 is a perspective view of a second embodiment of a tracking unit which may be included in the system shown in FIG. 8 and showing a pull cord to generate a pull-cord alert.

As shown in FIGS. 8 and 12, an external IR receiver 254 may also be used. The external IR receiver 254 includes an external clip 256 for attaching it to an item of outer clothing, such as the lapel of a jacket, or to a carry strap. The external clip 256 may take several forms, including a flexible or spring-loaded leaver, a pin, or a fabric hook and loop fastener such as Velcro. An electrical cable 257 and plug 258 connect the external IR receiver 254 to the reader 240 by means of a plug port 259. The external IR receiver 254 includes an electrical amplifier/filter 244 and a signal demodulator 246. The signal demodulator 246 sends the converted digital IR location signal to the reader's data processor 248 by way of the electrical cable 57. In high ambient light conditions where it is necessary to use the RF transmitters 265 in place of IR transmitters 220 as described above, the IR receiver 242 of the reader 240 may be replaced or incorporated to operate selectively or continuously in tandem or together with a similarly-functional RF receiver.

The internal data processor 248 is also operable to generate a number of auxiliary alarm signals upon detection of certain predetermined alarm conditions. The auxiliary alarm signals are also carried on the watchdog signal to be interpreted by the computer monitor system 280 for display as one of several alerts. A manual emergency switch 241 may be activated to close an internal electrical switch to generate an electrical signal, actuating the transmitter to transmit an immediate panic alarm signal. A pull cord switch assembly 243 is operative to generate a tamper alert when pull cord 245 is pulled, separating the pull cord switch assembly 243 from the rest of the reader 240, triggering the pull cord switch 247, and indicating that someone has attempted to remove the reader 240 from the mobile unit. The pull cord 245 is attached at one end to the pull cord switch assembly 243, and at the other end to the mobile unit itself.

An orientation detector is included, consisting in the preferred embodiment of a mercury tilt switch, normally open, that is operative, when the reader is tilted more than 60 degrees, plus or minus 10 degrees, from its normal upright attitude, to close and trigger a man-down switch 249 and to cause the internal data processor 248 to generate a man-down alarm signal when the reader 240 is rotated in any direction beyond a predetermined tolerance of 15 degrees. Such rotation is indicative that the mobile unit or person carrying the reader 240 has become disabled and has fallen down. In the case of a security guard or other person, the man-down alert allows help to be summoned in the case that the security guard is injured and unable to summon help him/herself. In an alternative embodiment, the data processor 248 can be programmed to delay sending the man-down alarm signal for a predetermined time, and instead flash an LED or trigger an audible buzzer to give the person an opportunity to return the reader 240 to the proper orientation no alarm.

The watchdog signal sent by the reader 240 is received by one or more RF receivers 260, which converts the watchdog signal to a serial data stream to be communicated to the computer monitor system 280 by way of an RS-232 serial cable, the data stream conforming to the RS-232 standard. The RF receiver 260 is powered by a 12 to Volt DC power supply 262, and operates using 900 MHz Spread Spectrum Technology to provide a FCC-certified wireless communications link, receiving the watchdog signal via a 3.5-inch antenna 264. When the readers 240 are to be used in large open areas, wireless RF repeaters (FIG. 8) may optionally be used to greatly extend the transmitting range of the readers 240. The RF repeaters 266 operate on a 12 to 20-volt AC power supply, and operate to receive the watchdog signal from the readers and amplify and retransmit it to the RF receivers 260.

As depicted in FIG. 8, the computer monitor system 280 consists of a local computer 282 fitted with a keyboard 283, mouse 284, video display monitor 285, and a printer 286. The RF receiver 260 receives the watchdog signal and converts it to a serial data stream recognizable and readable by a personal computer or a microcomputer.

In the preferred embodiment, the local computer 282 is an IBM PC-compatible personal computer including an Intel Pentium processor, and capable of running an operating system such as Microsoft (MS) Windows 3.1, MS Windows for Workgroups 3.11, MS Windows 95, MS Windows NT 4.0, or a later version of one of these operating systems that is backward-compatible with software currently operable. The local computer 282 is equipped with at least 16 Megabytes (MB) of random access memory (RAM), though 32 MB is recommended if MS Windows NT is the selected operating system. The local computer 282 also includes a video card for displaying video at a resolution of 1024×768 pixels in at least 16 colors on a 17-inch color video display monitor. An appropriate sound card will allow local alerts to be audibly signaled, and a backup system, for instance, a magnetic tape backup system, will protect system data from loss.

As depicted in FIG. 8, the computer monitor system 280 is connected to an input/output (I/O) interface 288, allowing events registered by the computer monitor system 280 to activate other devices or systems, such as a closed-circuit television (CCTV) system 290 including cameras and monitors, an intercom system 292, or an alarm system 294 including other audible and/or visual alarms such as siren horns, bells, and/or warning lights, or a modem/dialer 296 to contact and send information to another monitoring center, allowing the local computer 282 to be left unattended, calling a central headquarters when alarm conditions are present.

The local computer 282 is equipped with a software program to monitor in excess of 65,000 readers 240, 65,000 IR transmitters 220, and up to eight RF receivers 260, and includes a software database containing all of the attributes of each of these items, including the identification codes associated with each reader and IR transmitter. By comparing the incoming watchdog signal with the values contained in this database, the local computer 282 is operative to display the source of the discerned location signal and reader identification signal. By way of this software program, the local computer is programmed to record the time, according to its internal clock, of receipt of the watchdog signals from the RF receivers 260. The software program records all watchdog signals and alarm signals including emergency manual panic alarms, man-down alarms, pull cord tamper alarms, and alarms related to failure of the reader 240 to detect a location signal or failure to detect a location signal different from the one most recently received by the reader (indicating the mobile unit has become stationary). The software generates a complete log of every transaction that occurs during a monitoring period and provides summary reports of particular actions, such as instances when a watchdog signal is not received, a highlighting of potential injury to mobile units, and notification that certain mobile units have, without prior authorization, been removed from the monitoring area.

In operation, the end user installs the desired number of IR transmitters 220 throughout the area to be monitored, taking care to place the IR transmitters no closer than the effective signal range to ensure that each reader 240 receives only one IR location signal at a time. The DIP switches 222 on each IR transmitter 220 are set to identify each room or section of the area to be monitored with a unique location code. The location codes set for each IR transmitter 220 are also entered into the database of the software program of local computer 282, so the receipt of a particular location code by the local computer 282 will allow an indication of the actual corresponding physical location to be displayed by the monitoring system 280.

A plurality of RF receivers 260 are also installed at locations throughout the monitored area such that the entire monitored area is covered by the effective reception range of the RF receivers 260. The RF receivers 260 are then connected by cable to the monitoring system 280.

Each person to be tracked in the area to be monitored is issued a reader 240. The database of the software program of local computer 282 is updated to correlate the identity of the person to be tracked with the unique identification of the reader 240, such that when the monitoring system 280 receives a signal from a particular reader 240, the local computer 282 will display the identity of the person carrying that reader 240.

As the person carrying the reader 240 moves about the monitored area, he/she will continually be moving into the signal range of different IR transmitters 220. If the person is wearing heavy clothing, he/she may choose to use the external IR receiver 254 and clip it to his/her outer clothing, while carrying the reader 240 in a pocket, on a belt, or around the neck on a carry strap and plugging the electrical cable 257 into the reader's plug port 259. The IR receiver 242 (internal) or 254 (external) of the reader 240 detects the IR location signal and communicates the last two received location signals to the internal data processor 248. The data processor 248 combines the location signal with its own unique identification signal and periodically causes the reader's RF transmitter 250 to transmit a watchdog signal.

If the person is in apprehension of some harm, he/she may activate a panic alarm by manually actuating the manual emergency switch 241, which causes the data processor 248 to generate a panic alarm signal and combine it with the watchdog signal. If the person should fall, the reader's man-down switch 249 is actuated if the reader 240 tilts more than 60 degrees, plus or minus 10 degrees, from the normal upright position and isn't righted within a predetermined time. When actuated, the man-down switch 249 causes the data processor to generate a man-down alarm signal, which is combined with the watchdog signal transmitted by RF transmitter 250. A pull-cord assembly 243 is attached at one end to the reader 240 and at the other end to the person carrying the reader. If the reader 240 is forcibly removed from the person, for instance in case of an attack by a violent perpetrator, the pull-cord switch 247 is actuated, causing the data processor to generate a pull-cord alarm signal, which is combined with the watchdog signal.

The watchdog signal transmitted by the reader 240 is received by the closest RF receiver 260 and communicated to the local computer 282 of the monitor system 280. The software program of the local computer 282 reads the IR transmitter or RF locator location signals, reader identification signals, and any alarm signals, and compares the signals to its database to generate one or more displays that indicate the identity of the person carrying the particular reader 240, the location of the IR transmitter 220 closest to the person, the location of the IR transmitter 220 most recently previously encountered by the reader 240, and any alarm conditions indicated by the alarm signals. The incoming signals may also cause the monitoring system 280 to produce an audible alarm, communicate with another monitoring location by means of the dialer/modem 296, activate a CCTV system 290 to visually monitor the location, or activate an intercom system 292, so verbal communication with the person being tracked may be initiated.

While multiple particular forms of the present invention have been illustrated and described, it will also be apparent that various modifications can be made without departing from the spirit and scope of the invention.

What is claimed is:

1. A security apparatus for monitoring a condition of a mobile unit to be located in a predetermined area and comprising:

a plurality of location transmitters to be spaced a selected distance apart within said predetermined area and operative to generate and transmit respective location signals identifying the respective location transmitters;

at least one portable reader to be carried on said mobile unit and including a portable receiver for receiving said location signals and a signal generator responsive to said location signals to generate a spread spectrum watchdog signal corresponding to the respective location signals and indicative of the particular said portable reader, said portable reader also including a portable transmitter for transmitting said spread spectrum watchdog signal;

at least one stationary receiver responsive to said watchdog signal to despread and demodulate said watchdog signal to generate a control signal indicative of said watchdog signal; and a monitor for coupling with said stationary receiver and responsive to said control signal to generate a readout indicative of the location transmitter generating the respective location signals.

2. A security apparatus according to claim 1 for connection with a selected power source and wherein:

said location transmitters are adapted for connection with said selected power source and are operative to generate respective location signals having a predetermined strength at a predetermined distance from the respective said location transmitters; and said portable receivers being operative to, upon detecting said location signals at or above said predetermined strength, generate said watchdog signals.

3. A security apparatus according to claim 1, wherein:
   said monitor is operative to generate said readout signal as a visual signal or audio signal.

4. A security apparatus according to claim 1, wherein:
   said monitor includes a computer.

5. A security apparatus according to claim 1, wherein:
   said portable readers include respective auxiliary inputs operative to generate auxiliary signals to be carried on the respective watchdog signals to produce respective auxiliary watchdog signals;

said monitor includes a receiver responsive to said auxiliary watchdog signals to generate corresponding auxiliary electrical signals; and said monitor includes an auxiliary alert responsive to said auxiliary electrical signals to generate an alert.

6. A security apparatus according to claim 1, wherein:
   said portable reader includes a detector responsive to the absence of said location signal to generate and transmit a missing-unit alarm signal;

said receiver includes means responsive to said missing-unit alarm signal to generate a missing-unit alarm electrical signal; and said monitor includes an alarm responsive to said alarm electrical signal to generate a perceptible alarm.

7. A security apparatus according to claim 1, wherein:
   said portable reader includes a plurality of components and a tamper circuit connected with said components and responsive to shifting of any one of said components to generate a portable reader tamper signal; and said receiver is responsive to said portable reader tamper signal to generate a portable reader tamper electrical signal; and said monitor is responsive to said electrical signal to generate a tamper alarm.

8. A security apparatus according to claim 5 wherein:
   said auxiliary inputs include a manual actuation button which may be activated to close an internal switch to generate an electrical signal, actuating the transmitter to transmit an immediate panic alarm signal.

9. A security apparatus according to claim 1 wherein:

said monitor includes a memory for detecting watchdog signals corresponding to each of said location transmitters and a detector responsive to the absence of watchdog signals from at least one of said location transmitters to generate an electrical loss signal, and a loss alert responsive to said loss signal to generate a loss alert alarm.

10. A security apparatus according to claim 1 wherein:

said monitor includes a detector for detecting the presence of a watchdog signal corresponding with each of said transmitters and operative in response to the absence of a watch dog signal corresponding with any one of said transmitters to generate a location alert electrical signal, and a loss alert responsive to said electrical signal to generate a loss alarm.

11. A security apparatus according to claim 1 wherein:

said portable readers include a detector for detecting the respective actual attitude and orientation of the respective said portable readers relative to respective reference attitudes and orientations to, upon detection of said actual attitude and orientation differing from said reference attitude and orientation, generate respective man-down electrical signals if said attitude and orientation deviates from said reference by more than a predetermined amount; and said monitor is responsive to said man-down electrical signal to generate a man-down alarm.

12. A security apparatus as set forth in claim 1 wherein:

said signal generator is responsive to said location signals to generate a 900 MHz spread spectrum watchdog signal.

13. A security system for monitoring and tracking the movement and condition of a plurality of mobile remote units located within a predetermined area of interest, comprising:

a plurality of fixed infrared transmitters located at selected locations throughout said predetermined area of interest, each of said fixed infrared transmitters generating and transmitting a unique location signal of a predetermined signal strength and signal range such that said fixed infrared transmitters may be arranged in a spaced apart manner at a distance equal to approximately twice said known signal range;

at least one portable reader, including a portable infrared receiver responsive to said location signals from said fixed infrared transmitters, attached to each of said mobile remote units and operative to generate and transmit a spread spectrum watchdog signal, said watchdog signal carrying said unique location signal as well as a unique portable reader identification signal;

at least one fixed receiver for receipt, despread and demodulation of said watchdog signal and located such that said watchdog signals may be detected throughout entire said predetermined area of interest; and a monitor system connected with said fixed receiver and responsive to said watchdog signal to display identification and location information.

14. The security system of claim 13, further including:

at least one radio frequency repeater to receive said watchdog signal and retransmit it to said fixed receivers.

15. The security system of claim 13, wherein:

said portable reader includes an auxiliary alarm signal generator for generating and sending auxiliary alarm signals on the respective said watchdog signals; and said monitor system is further responsive to said auxiliary alarm signals to monitor and report respective said auxiliary alarm signals received.

16. The security system of claim 15, wherein:

said portable reader includes an exterior casing;

said portable receiver is located outside said exterior casing and is connected to said portable reader by a suitable electrical cable and includes a clip for releasable attachment to outer clothing; and said portable reader includes a clip for releasably fastening said portable reader to a piece of clothing or hanger.

17. The security system of claim 15, that includes:

a flexible tether attaching said portable receiver to said portable reader such that said portable receiver may be manipulated about relative to said portable reader.

18. The security system of claim 15, wherein:

said portable reader is responsive to the absence of any of said location signals to cause said auxiliary alarm signal generator to generate a location loss auxiliary alarm signal to be carried on said watchdog signal; and said monitor system is responsive to said location loss auxiliary alarm signal to generate a location loss alert.

19. The security system of claim 15, wherein:

said portable reader includes a manual switch to cause said auxiliary alarm signal generator to generate a manual panic auxiliary alarm signal to be carried on said watchdog signal; and said monitor system is responsive to said manual panic auxiliary alarm signal to generate a manual panic alert.

20. The security system of claim 15, wherein:

said portable reader includes a detachable pull-cord switch assembly and a pull-cord switch responsive to disconnection of said pull-cord switch assembly to cause said auxiliary alarm signal generator to generate a pull-cord auxiliary alarm signal to be carried on said watchdog signal; and said monitor system is responsive to said pull-cord auxiliary alarm signal to generate a pull-cord alert.

21. The security system of claim 15, wherein:

said portable reader includes a detector to detect change in attitude or orientation relative to a preselected reference and is responsive to a predetermined magnitude of said change to cause said auxiliary alarm signal generator to generate a man-down auxiliary alarm signal to be carried on said watchdog signal; and said monitor system is responsive to said man-down auxiliary alarm signal to generate a man-down alert.

22. The security system of claim 13, wherein:

said monitor system includes a computer.

23. The security system of claim 22, wherein:

said computer includes an input interface to read said watchdog signal and a software control program responsive to said watchdog signal, a software database of all said location signals, portable reader identification signals, and auxiliary alarm signals, and an output interface operative to direct said signals to a display device to display indices corresponding with the respective said signals.

24. A security apparatus as set forth in claim 13 wherein:

said signal generator is responsive to said location signals to generate a 900 MHz spread spectrum watchdog signal.

25. A security apparatus as set forth in claim 13 wherein:

said location transmitters and portable receivers may be replaced or incorporated to operate selectively or continuously in tandem using infrared and RF to be operative indoors in high ambient light conditions and outdoors.

26. A personal duress security system for monitoring the location, motion, and status of each of a plurality of persons located within a preselected area, and comprising:

a plurality of fixed infrared transmitters installed at various selected locations throughout said preselected area and operative to generate respective infrared signals unique to each of said infrared transmitters;

a plurality of portable personal tracking units bearing respective identification indicia and including respective infrared receivers, internal data processors, and radio frequency transmitters connected together in an electrical circuit, said infrared receivers operative to detect the respective said infrared signals and operative in response thereto to generate an actuation signal and to communicate said actuation signal to said data processor, said data processor being responsive to said actuation signals and operative to periodically generate a spread spectrum watchdog signal including last two received said actuation signals corresponding with the respective infrared signals and carrying as a component, a tracking unit identification signal, and any of a plurality of alarm signals in response to a selected plurality of alarm conditions and direct said watchdog signal to said radio frequency transmitter, said radio frequency transmitter being operative to periodically broadcast said watchdog signal;

a computer control system responsive to said watchdog signal and operative to distinguish said location signal, said identification signal, and said alarm signals from each other within said watchdog signal and consult a database of known values for said signals such that the location of the last two infrared transmitters, the identity of the person associated with said tracking unit, and the presence of any of said plurality of alarm conditions causing one or more of said plurality of alarm signals may be displayed in a convenient manner on a computer monitor and/or a computer printer; and at least one radio frequency receiver connected to said computer control system and operative to receive, despread and demodulate said watchdog signal and carry it to said computer control system.

27. The personal duress security system of claim 26, further including:

at least one radio frequency repeater operative to detect said watchdog signal and retransmit it to said radio frequency receivers.

28. The personal duress security system of claim 26, wherein:

said infrared receiver is flexibly connected to the exterior of said tracking unit such that said tracking unit may be carried by hand or in a pocket and said infrared receiver may be releasably attached to an article of outer clothing.

29. The personal duress security system of claim 26, wherein:

said tracking unit includes a manual switch operative to generate a panic alarm signal; and said computer control system is responsive to said panic alarm signals to display a panic alert.

30. The personal duress security system of claim 29, wherein:

said internal data processor includes a detector operative to determine that it is not receiving any said location signal and generate a second said one of said alarm signals; and said computer control system is responsive to said second alarm signal to display an out-of-area alert.

31. The personal duress security system of claim 29, wherein:

said tracking units include a respective pull-cord switch operative to generate respective pull-cord alarm signals and respective detachable pull-cord switch assemblies operative upon pulling thereon to actuate the respective pull-cord switches; and said computer control system is responsive to said pull-cord alarm signals to display a pull-cord alert.

32. The personal duress security system of claim 29, wherein:

said internal data processor includes an orientation detector to detect any change in attitude or orientation of said tracking unit relative to a preselected reference and generate a man-down alarm signals; and said computer control system is responsive to said man-down alarm signal to display a man-down alert.

33. The personal duress security system of claim 26, further including:

an alarm system coupled with said computer control system and responsive to said alarm signals and operative to generate an audible alert.

34. A security apparatus as set forth in claim 26 wherein:

said signal generator is responsive to said location signals to generate a 900 MHz spread spectrum watchdog signal.

35. A portable security apparatus for use with a security system for monitoring the location, movement, and status of at least one mobile unit to be located in a predetermined area including at least one infrared transmitter to be located at a selected location within said predetermined area and operative to transmit an infrared location signal indicative of said infrared transmitter, said apparatus comprising:

a radio frequency transmitter operative to generate a spread spectrum watchdog signal;

at least one radio frequency receiver located within said predetermined area and operative to receive and despread and demodulate said watchdog signal and transmit it to a monitor system, said monitor system operative to convert said watchdog signal to a useful display, said apparatus comprising:

an infrared receiver operative to receive said location signal; and a signal generator operative to generate an identification signal unique to said apparatus, said identification signal being carried on said watchdog signal, said watchdog signal including said location signal.

36. The portable security apparatus of claim 35, wherein:

said infrared receiver includes a clip for releasable attachment to an article of clothing and is flexibly attached to the exterior of said apparatus by a suitable electrical cable.

37. The portable security apparatus of claim 35, wherein:

said signal generator includes a memory operative to store last two said location signals detected, said signal generator also operative to include said last two location signals with said watchdog signal.

38. The portable security apparatus of claim 35, further including:

a manual switch operative to cause said signal generator to generate a manual panic alarm signal to be included in said watchdog signal.

39. The portable security apparatus of claim 35, further including:
   an external housing encasing said apparatus; and
   a data port connector formed through said housing and operative to allow an external programming device to connect to said signal generator and memory to permit programming thereof.

40. A security apparatus as set forth in claim 35 wherein:
   said signal generator is responsive to said location signals to generate a 900 MHz spread spectrum watchdog signal.

41. A security apparatus as set forth in claim 35 wherein:
   said signal generator is responsive to said location signals to generate a 900 MHz spread spectrum watchdog signal.

42. A security apparatus for monitoring a condition of a mobile unit to be located in a predetermined area and comprising:
   a plurality of location transmitters to be spaced a selected distance apart within said predetermined area and operative to generate and transmit respective location signals identifying the respective location transmitters;
   at least one portable reader to be carried on said mobile unit and including a portable receiver for receiving said location signals and responsive to said location signals to generate a spread spectrum watchdog signal corresponding to the respective location signals and also including a portable transmitter for transmitting said watchdog signal and further including respective auxiliary inputs operative to generate auxiliary signals to be carried on said watchdog signal to produce respective auxiliary watchdog signals;
   at least one stationary receiver responsive to despread and demodulate said watchdog signal to generate a control signal indicative of said watchdog signal; and
   a monitor for coupling with said stationary receiver and responsive to said control signal to generate a readout indicative of the location transmitter generating the respective location signals and including a receiver responsive to said auxiliary watchdog signals to generate corresponding auxiliary electrical signals; and
   said monitor includes an auxiliary alert responsive to said auxiliary electrical signals to generate an alert.

43. A security apparatus as set forth in claim 42 wherein:
   said signal generator is responsive to said location signals to generate a 900 MHz spread spectrum watchdog signal.

44. A security system for monitoring and tracking the movement and condition of a plurality of mobile remote units located within a predetermined area of interest, comprising:
   a plurality of fixed transmitters located at selected locations throughout said predetermined area of interest, each of said transmitters generating and transmitting a unique location signal of a predetermined signal strength and signal range such that said fixed transmitters may be arranged in a spaced apart manner at a distance equal to approximately twice said known signal range;
   at least one portable reader, including a portable receiver responsive to said location signals from said fixed transmitters, attached to each of said mobile remote units and operative to generate and transmit a spread spectrum watchdog signal, said watchdog signal carrying said unique location signal as well as a unique portable reader identification signal, said portable reader further including an auxiliary alarm signal generator operative to generate and send auxiliary alarm signals on the watchdog signal;
   at least one fixed receiver for receipt, despread and demodulation of said watchdog signal and located such that said watchdog signals may be detected throughout entire said predetermined area of interest; and
   a monitor system connected with said fixed receiver and responsive to said watchdog signal to display identification and location information as well as to monitor and report said auxiliary alann signals received.

45. A security apparatus as set forth in claim 44 wherein:
   said signal generator is responsive to said location signals to generate a 900 MHz spread spectrum watchdog signal.

46. A security system for monitoring and tracking the movement and condition of a plurality of mobile remote units located within a predetermined area of interest, comprising:
   a plurality of fixed transmitters located at selected locations throughout said predetermined area of interest, each of said transmitters generating and transmitting a unique location signal of a predetermined signal strength and signal range such that said fixed transmitters may be arranged in a spaced apart manner at a distance equal to approximately twice said known signal range;
   at least one portable reader, including a portable receiver responsive to said location signals from said fixed transmitters, attached to each of said mobile remote units and operative to generate and transmit a spread spectrum watchdog signal, said watchdog signal carrying said unique location signal as well as a unique portable reader identification signal;
   at least one fixed receiver for receipt, despread and demodulation of said watchdog signal and located such that said watchdog signals may be detected throughout entire said predetermined area of interest; and
   a monitor system connected with said fixed receiver and responsive to said watchdog signal to display identification and location information, said monitor system including a computer, said computer including an input interface to read said watchdog signal and a software control program responsive to said watchdog signal, a software database of all said location signals, portable reader identification signals, and auxiliary alarm signals, and an output interface operative to direct said signals to a display device to display indices corresponding with the respective said signals.

47. A security apparatus as set forth in claim 46 wherein:
   said signal generator is responsive to said location signals to generate a 900 MHz spread spectrum watchdog signal.

48. A personal duress security system for monitoring the location, motion, and status of each of a plurality of persons located within a preselected area, and comprising:
   a plurality of fixed infrared transmitters installed at various selected locations throughout said preselected area and operative to generate respective infrared signals unique to each of said infrared transmitters;
   a plurality of portable personal tracking units bearing respective identification indicia and including respective infrared receivers, internal data processors, and radio frequency transmitters connected together in an electrical circuit, said infrared receivers operative to detect the respective said infrared signals and operative in response thereto to generate an actuation signal and to communicate said actuation signal to said data processor, said data processor being responsive to said actuation signals and operative to periodically generate a spread spectrum watchdog signal including last two received said actuation signals corresponding with the respective infrared signals and carrying as a component, a tracking unit identification signal, and any of a plurality of alarm signals in response to a selected plurality of alarm conditions and direct said watchdog signal to said radio frequency transmitter, said radio frequency transmitter being operative to periodically broadcast said watchdog signal;

said tracking unit further includes a manual switch operative to generate a panic alarm signal;

said tracking unit further includes an orientation detector to detect any change in attitude or orientation of said tracking unit relative to a preselected reference and generate a man-down alarm signal;

a computer control system responsive to said watchdog signal and operative to distinguish said location signal, said identification signal, and said alarm signals from each other within said watchdog signal and consult a database of known values for said signals such that the location of the last two infrared transmitters, the identity of the person associated with said tracking unit, and the presence of any of said plurality of alarm conditions causing one or more of said plurality of alarm signals may be displayed in a convenient manner on a computer monitor and/or a computer printer; said computer control system further responsive to said panic alarm signal to display a panic alert and also responsive to said man-down alarm signal to display a man-down alert; and at least one radio frequency receiver connected to said computer control system and operative to receive, despread and demodulate said watchdog signal and carry it to said computer control system.

49. A security apparatus as set forth in claim 48 wherein:

said signal generator is responsive to said location signals to generate a 900 MHz spread spectrum watchdog signal.

50. A monitoring system for identifying and tracking at least one selected mobile unit present within a predetermined area, comprising:

at least one fixed infrared location transmitter located within said predetermined area and including a location signal generator operative to generate a unique location signal, said location transmitter operative to broadcast said location signal;

a portable reader carried on each of said at least one selected mobile units and including an infrared receiver operative to receive said location signal, a signal processor electronically connected to said infrared receiver and operative to combine said location signal with an identification signal unique to each of said portable readers and to generate a combined spread spectrum watchdog signal, and a radio frequency transmitter electronically connected to said signal processor and operative to broadcast said watchdog signal;

at least one fixed radio frequency receiver operative to receive, despread and demodulate said watchdog signal and relay it to a central monitoring station, said central monitoring station responsive to said watchdog signal and operative to decode said combined watchdog signal, determine location and identify of said at least one selected mobile unit, and display information relating to said location and identity in a useful format.

51. The monitoring system of claim 50, wherein:

said portable reader further includes at least one sensor responsive to a predetermined condition, said sensor being electronically connected to said signal processor and operative to generate an alarm signal in response to detection of said predetermined condition and send said alarm signal to said signal processor for combination into said combined watchdog signal; and said central monitoring station is further operative to also determine from said alarm signal within said watchdog signal the existence of said predetermined condition and display information related to existence of said predetermined condition.

52. The monitoring system of claim 50, wherein:

said portable reader further includes a memory operative to store the last previously received said location signal, said memory electronically connected to said signal processor, said signal processor further combining said last previously received location signal into said combined watchdog signal; and said central monitoring station is further operative to determine from said last previously received location signal within said watchdog signal a previous location of said portable reader and display information related to said previous location.

53. A security apparatus as set forth in claim 50 wherein:

said signal generator is responsive to said location signals to generate a 900 MHz spread spectrum watchdog signal.

* * * * *